(12) United States Patent
Takayasu et al.

(10) Patent No.: US 6,855,406 B2
(45) Date of Patent: Feb. 15, 2005

(54) POLYOLEFIN RESIN COMPOSITION AND SHRINK FILM MADE FROM THE SAME

(75) Inventors: Hiroshi Takayasu, Ichihara (JP); Norihide Inoue, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 10 days.

(21) Appl. No.: 10/365,480

(22) Filed: Feb. 13, 2003

(65) Prior Publication Data
US 2003/0152792 A1 Aug. 14, 2003

(30) Foreign Application Priority Data
Feb. 14, 2002 (JP) ........................ 2002-037271

(51) Int. Cl.$^7$ ..................... B32B 27/32; C08F 10/00; C08J 5/18; C08L 23/00
(52) U.S. Cl. .............. 428/220; 428/475.8; 428/476.1; 428/476.3; 428/476.9; 428/483; 428/516; 428/517; 428/910; 524/499; 525/185; 525/216; 525/240
(58) Field of Search ............. 428/220, 475.8, 428/476.1, 476.3, 476.9, 483, 516, 517, 910; 524/499; 525/185, 216, 240

(56) References Cited

U.S. PATENT DOCUMENTS 5,106,692 A * 4/1992 Shigemoto ............. 428/412
5,718,982 A * 2/1998 Kawachi et al. ........... 428/516

FOREIGN PATENT DOCUMENTS

| EP | 0499669 A1 | 8/1992 |
|---|---|---|
| EP | 0 629 631 A2 | 12/1994 |
| EP | 1179563 A2 | 2/2002 |
| JP | 7-138326 A | 5/1995 |
| JP | 2000-246797 A | 9/2000 |
| JP | 2001-294678 A | 10/2001 |
| WO | WO 95/14717 A | 6/1995 |

OTHER PUBLICATIONS

Database WPI, Section Ch., Week 198717, Derwent Publications Ltd., London, GB; AN 1987–119201 XP002236116, Mar. 19, 1987.

* cited by examiner

*Primary Examiner*—D. S. Nakarani
(74) *Attorney, Agent, or Firm*—Birch, Stewart, Kolasch & Birch, LLP

(57) ABSTRACT

A polyolefin resin composition comprises (A) 10 to 100 wt % of a propylene/α-olefin random copolymer obtained by random copolymerization of propylene and a $C_2$ to $C_{20}$ α-olefin, and having a melting point as measured by DSC of 40 to 115° C. and an α-olefin content of 5 to 70 mol %, (B) 0 to 90 wt % of a random propylene resin having a melting point as measured by DSC of 120 to 150° C., and (C) an alicyclic saturated hydrocarbon resin having a glass transition point of 20 to 100° C. and a number average molecular weight of 1200 or less, the component (C) being used in an amount of 5 to 100 weight parts per 100 weight parts of the total amount of the components (A) and (B). A single-layer or multilayer film obtained from the polyolefin resin composition can be stretched at a lower temperature than in the conventional one, and a shrink film obtained by such a low-temperature stretching has a higher shrinkage factor than one stretched at a high temperature, and also has a small natural shrinkage factor.

12 Claims, No Drawings

POLYOLEFIN RESIN COMPOSITION AND SHRINK FILM MADE FROM THE SAME

FIELD OF THE INVENTION

The present invention relates to a polyolefin resin composition for a shrink film used mainly in shrink labels and the like, and a shrink film made from the same, and more particularly relates to a shrink film that has a high shrinkage factor at low temperatures, has excellent mechanical properties and optical characteristics, and undergoes very little natural shrinkage.

BACKGROUND OF THE INVENTION

Polyvinyl chloride resins, polystyrene resins, and the like are well known as materials widely used for shrink films, however, the by-products of the discarded resins are detrimental to humans and the environment. Therefore, shrink films made from polyolefins are under development today. Shrink films produced from conventional polyolefin resins have inferior mechanical properties, thermal shrinkage at low temperatures, and other such characteristics as compared to those made from vinyl chloride resins. Particularly when these films are used as shrink labels for PET beverage bottles, the film is usually shrunken along with the PET bottle in a shrink tunnel using steam or the like, and therefore a shrink film that exhibits a high shrinkage factor at lower temperatures is demanded. Furthermore, when PET bottles are recycled, their labels are pulverized along with the PET resin itself, with the label resin usually being separated from the PET resin of the bottle by a liquid specific gravity separation process that uses the difference in buoyancy in water between these materials. However, a polystyrene resin, for instance, has a specific gravity of about 1.03 to 1.06, and sinks in water along with a PET-based resin, whose specific gravity is 1.3 to 1.5. Therefore, labels made from a resin having a specific gravity of 1 or higher are difficult to separate from a PET resin by the above method. Accordingly, there is a demand for a shrink film that has a specific gravity of less than 1, is made from a polyolefin, and shrinks at low temperatures.

For example, Japanese Laid-Open Patent Application 2001-109429, discloses a "Heatshrinkable Polypropylene-based Film" where the comonomer content of a polypropylene-based film is 27%. This film has excellent transparency and heat-shrinkability at low temperatures, however, it does not necessarily have the rigidity and heat resistance required for a film. Also, the natural shrinkage factor ends up being large when an attempt is made to raise the heat shrinkage factor of a shrink film made from a polyolefin such as polypropylene. Consequently, there is a demand for a shrink film that strikes a good balance between heat shrinkage factor and natural shrinkage factor.

It is an object of the present invention to provide a shrink (label) film that is based on a polypropylene resin with excellent rigidity and transparency, that can be stretched at low temperatures, namely at 80° C. or lower, that has a shrinkage factor at 80° C. of at least 30%, and preferably at least 35%, and a shrinkage factor at 90° C. of at least 40%, and preferably at least 45%, and whose appearance is good enough for practical application.

SUMMARY OF THE INVENTION

The polyolefin resin composition that achieves the above mentioned object comprises (A) 10 to 100 wt % of a propylene/α-olefin random copolymer obtained by random copolymerization of propylene and a $C_2$ to $C_{20}$ α-olefin, and having a melting point as measured by differential scanning calorimeter (DSC) of 40 to 115° C. and an α-olefin content of 5 to 70 mol %; (B) 0 to 90 wt % of a random propylene resin having a melting point as measured by DSC of 120 to 150° C.; and (C) an alicyclic saturated hydrocarbon resin having a glass transition point of 20 to 100° C. and a number average molecular weight of 1200 or less, the component (C) being used in an amount of 5 to 100 weight parts per 100 weight parts of the total amount of the components (A) and (B).

The shrink film according to the present invention is a stretched film with a single-layer structure formed from the above resin composition, or a stretched film with a multi-layer structure having one or more layers formed from the above resin composition.

The polyolefin resin composition according to the present invention and the shrink film produced from this composition will be described in detail below.

The polyolefin resin composition comprises (A) a propylene/α-olefin random copolymer, (B) a random propylene resin, and (C) an alicyclic saturated hydrocarbon resin.

(A) Propylene/α-olefin Random Copolymer

The propylene/α-olefin random copolymer (A) that is one of the constituent components of the polyolefin resin composition for a shrink film of the present invention is a propylene/α-olefin random copolymer having a melting point as measured by DSC of 40 to 115° C., and preferably 65 to 110° C., and containing propylene and at least one type of other α-olefin, the other α-olefin content in the copolymer being 5 to 70 mol %, and preferably 20 to 50 mol %. The "α-olefin content" in the copolymer (A) refers to structural units derived from α-olefin, and this content is found by infrared spectroscopy. The "α-olefin" used in the manufacture of the propylene/α-olefin random copolymer refers to an α-olefin with 2 to 20 carbons other than propylene, and examples of such α-olefins include ethylene, 1-butene, 1-pentene, 4-methyl-1-pentene, 1-hexene, 1-heptene, 1-octene, and 1-decene. Ethylene and 1-butene are preferred.

The density (ASTM D 1505, 23° C.) of the propylene/α-olefin random copolymer (A) used in the present invention is usually 0.85 to 0.91 g/cm$^3$, and preferably 0.86 to 0.89 g/cm$^3$. The melt flow rate (MFR; ASTM D 1238, 230° C., 2.16 kg load) of the propylene/α-olefin random copolymer (A) used in the present invention is usually 0.1 to 20 g/10 minutes, and preferably 1 to 10 g/10 minutes.

The polymerization catalyst used in the manufacture of the propylene/α-olefin random copolymer (A) can be a titanium- or vanadium-based Ziegler-Natta catalyst, a titanium-, zirconium-, or hafnium-based metallocene catalyst, or any known sterically regular catalyst used in olefin polymerization.

The molecular weight distribution (Mw/Mn) of the propylene/α-olefin random copolymer (A) is usually 5 or less as measured by gel permeation chromatography (GPC). When this propylene/α-olefin random copolymer is produced using a so-called metallocene-based catalyst made from titanium, zirconium, hafnium, or another transition metal compound as described in Japanese Laid-Open Patent Application H7-138326, W095/1417, and elsewhere, a propylene/α-olefin random copolymer can be obtained with a molecular weight distribution (Mw/Mn) of 3 or less as determined by gel permeation chromatography (GPC) and with a lower melting point. When this copolymer is used for the shrink film of the present invention, it is capable of obtaining a shrink label that shrinks well at a low temperature. Furthermore, the use of this copolymer is favorable in that it improves transparency and reduces surface tack.

(B) Random Propylene Resin

The melting point of the random propylene resin (B) used in the present invention, as measured by DSC, is 120 to 150° C., and preferably 130 to 140° C. The melt flow rate (MFR; ASTM D 1238, 2.16 kg load) of the random propylene resin used in the present invention is usually 0.5 to 10 g/10 minutes, and preferably 2 to 8 g/10 minutes. It is undesirable for the melting point to be higher than 150° C. because stretchability will decrease. On the other hand, it is also undesirable for the melting point to be lower than 120° C. because the mechanical properties and heat resistance of the film will decrease. This random propylene resin (B) is obtained by copolymerizing propylene with ethylene and/or butene or another $C_2$ to $C_{20}$ α-olefin.

(C) Alicyclic Saturated Hydrocarbon Resin

The alicyclic saturated hydrocarbon resin used in the present invention has a glass transition point of 20 to 100° C., and preferably of 50 to 90° C., and a number average molecular weight of 1200 or less, preferably 1000 or less, and more preferably 600 to 1000. It is undesirable for the glass transition point to be higher than 100° C. because the heat shrinkage factor at low temperatures will decrease. On the other hand, it is also undesirable for the glass transition point to be lower than 20° C. because the moldability of the film will suffer and the film surface will be tacky.

Polyolefin Resin Composition

The polyolefin resin composition according to the present invention comprises a propylene/α-olefin random copolymer (A), a random propylene resin (B), and an alicyclic saturated hydrocarbon resin (C). In the polyolefin resin composition, the propylene/α-olefin random copolymer (A) is contained in an amount of usually 10 to 100 wt %, and preferably 20 to 70 wt %, and the random propylene resin (B) is contained in an amount of usually 0 to 90 wt %, and preferably 30 to 80 wt %. In the polyolefin resin composition, the alicyclic saturated hydrocarbon resin (C) is contained in an amount of usually 5 to 100 weight parts, and preferably 25 to 75 weight parts, per 100 weight parts of the total amount of the components (A) and (B).

The composition may also contain a thermal stabilizer, antioxidant, UV absorbent, anti-blocking agent, slip agent, antistatic agent, weather stabilizer, anti-fogging agent, crystal nucleator, base absorbent, lubricant, flame retardant, or the like, within limits not prejudicial of the object of the present invention.

Single-layer or Multilayer Film

The single-layer film or multi-layer film of the present invention is a film with a single-layer made from the polyolefin resin composition, or a film with a multi-layer structure having at least one layer formed from the polyolefin resin composition. This film can be manufactured by a known molding method, such as inflation molding or T-die molding, and this film has a thickness of usually 50 to 500 μm.

Laminated Film

The laminated film of the present invention is the product of laminating another film on one or both sides of a film made from the polyolefin resin composition. There is no particular limitation on the film to be laminated, but examples thereof include polyolefin films made from the cyclic polyolefin resin proposed in Japanese Patent Laid-Open Application No. 2000-246797, or from polyethylene, polypropylene, ethylene/vinyl acetate copolymer, ethylene/acrylic acid copolymer, ethylene/methyl methacrylate copolymer, or the like; polystyrene films; polyester films made from polyethylene terephthalate, polybutylene terephthalate, or the like; polyamide films made from nylon 6 or nylon 6,6; and laminates of a gas barrier resin and an adhesive polyolefin such as a laminate of maleic anhydride modified polyethylene and ethylene/vinyl alcohol copolymer.

For laminating these films, an extrusion lamination process, and a dry lamination process using an anchor coating agent are employable.

The thickness of the laminated film is usually from 50 to 500 μm.

Shrink Film

The shrink film of the present invention can be obtained by uniaxially or biaxially stretching the above-mentioned film comprising the polyolefin resin composition at a temperature of 60° C. to 100° C., and preferably of 60° C. to 80° C. This stretching can be accomplished by any conventional methods for stretching a polyolefin resin film, for example, a uniaxial stretching method with a hot roll, or a biaxial stretching method such as simultaneous biaxial stretching by tubular, or successive biaxial stretching using a hot roll/tenter. There is no particular limitation on the draw ratio, but the draw ratio is usually at least 3 times, preferably 3 to 10 times, and more preferably 4 to 8 times. The thickness of the stretched film is usually 10 to 200 μm.

This stretched film can suitable be used as a shrink film of the present invention. The heat shrinkage factor of the film by an 80° C. shrinkage test is at least 30%, and preferably at least 35%, the heat shrinkage factor by a 90° C. shrinkage test is at least 40%, and preferably at least 45%, and the natural shrinkage factor by a natural shrinkage test at 40° C. is 6% or less, and preferably 4% or less. The natural shrinkage used herein means shrinkage during storage at room temperature to 40° C. after stretching the film.

DESCRIPTION OF THE PREFERRED EMBODIMENTS

The film raw material components used in Examples and Comparative Examples are listed below.

Propylene/α-olefin Random Copolymer (A)

1. Propylene/1-butene random copolymer (A1), trade name XR110T, made by Mitsui Chemicals, Inc.

butene content: 26 mol %

MFR (ASTM D 1238, 230° C., 2.16 kg load): 6.0 g/10 minutes melting point: 110° C.

Mw/Mn: 4.50

2. Propylene/1-butene random copolymer (A2), manufactured using the polymerization method and the metallocene-based catalyst described in Japanese Laid-Open Patent Application H7-13826 butene content: 30 mol %

MFR (ASTM D 1238, 230° C., 2.16 kg load): 4.9 g/10 minutes melting point: 85° C.

Mw/Mn: 1.97

3. Propylene/1-butene random copolymer (A3), manufactured using the polymerization method and the metallocene-based catalyst described in Japanese Laid-Open Patent Application H7-13826 butene content: 43.3 mol %

MFR (ASTM D 1238, 230° C., 2.16 kg load): 6.7 g/10 minutes melting point: 72° C.
Mw/Mn: 1.85
Random Propylene Resin (B)
1. Random polypropylene (B1)
   ethylene content: 4.2 mol %
   MFR (ASTM D 1238, 230° C., 2.16 kg load): 2.7 g/10 minutes
   melting point: 135° C.
Alicyclic Saturated Hydrocarbon Resin (C)
1. Petroleum resin (C1) (trade name P-125) made by Arakawa Chemical
   Mn: 820
   Tg (glass transition point): 80° C.
2. Petroleum resin (C2) (trade name P-140) made by Arakawa Chemical
   Mn: 970
   Tg (glass transition point): 90° C.

The stretched films obtained in Examples and Comparative Examples were subjected to a shrinkage factor test as follows. The stretched film was slit to a size of 15 mm×150 mm (stretching direction) to obtain a test sample, which was dipped for 10 seconds in 80° C. or 90° C. hot water, and the heat shrinkage factor was calculated according to Formula 1 from the difference in film dimensions before and after this heat treatment. Meanwhile, a test sample of the same dimensions as in the heat shrinkage factor test was aged for 5 days in an oven at 40° C. under normal pressure, and the natural shrinkage factor was calculated according to Formula 1 from the difference in film dimensions before and after this aging.

Formula 1

$$100 \times \{(\text{dimension in stretching direction before test}) - (\text{dimension in stretching direction after test})\} / ((\text{dimension in stretching direction after test}) \quad (1)$$

EXAMPLE 1

100 weight parts of a resin composition comprising 25 wt % of the above-mentioned propylene/1-butene random copolymer A1 and 75 wt % of the random polypropylene B1, and 30 weight parts of the petroleum resin C1 were blended and granulated in a granulator.

The pellets thus obtained were extruded at 200° C. from a cast film molding apparatus, which produced a single-layer film with a thickness of 250 μm. A sheet measuring 9 cm square was cut out from this film and stretched uniaxially with a tabletop biaxial stretching machine. This stretching was performed to a ratio of 5 times at a rate of 1 m/min after the sheet had been preheated for 2 minutes at a specific temperature.

The stretched film thus obtained was measured for shrinkage factor by the above test method. These results are given in Table 1.

EXAMPLE 2

A film was produced by the same method as in Example 1 using 100 weight parts of a composition comprising 50 wt % of the above-mentioned propylene/1-butene random copolymer A2 and 50 wt % of the random polypropylene B1, and 15 weight parts of the petroleum resin C2. This film was stretched to produce a uniaxially stretched sample.

The shrinkage factor of the stretched film thus obtained was measured by the same test method as in Example 1. These results are given in Table 1.

EXAMPLE 3

A film was produced by the same method as in Example 1 using 100 weight parts of a composition comprising 25 wt % of the above-mentioned propylene/1-butene random copolymer A3 and 75 wt % of the random polypropylene B1, and 20 weight parts of the petroleum resin C2.

This film was stretched to produce a uniaxially stretched sample. The shrinkage factor of the stretched film thus obtained was measured by the same test method as in Example 1. These results are given in Table 1.

EXAMPLE 4

A film was produced by the same method as in Example 1 using 100 weight parts of a composition comprising 50 wt % of the above-mentioned propylene/1-butene random copolymer A3 and 50 wt % of the random polypropylene B1, and 15 weight parts of the petroleum resin C2. This film was stretched to produce a uniaxially stretched sample.

The shrinkage factor of the stretched film thus obtained was measured by the same test method as in Example 1. These results are given in Table 1.

COMPARATIVE EXAMPLE 1

A film was produced by the same method as in Example 1 using 100 weight parts of the random polypropylene B1 and 25 weight parts of the petroleum resin C2. This film was stretched to produce a uniaxially stretched sample.

The shrinkage factor of the stretched film thus obtained was measured by the same test method as in Example 1. These results are given in Table 1.

TABLE 1

| | Resin composition | | | | | | Heat shrinkage factor (%) (stretching temp.: | | Natural shrinkage (%) |
|---|---|---|---|---|---|---|---|---|---|
| | A1 | A2 | A3 | B1 | C1 | C2 | 70° C.) | | 5 days at |
| | | | | | * | * | 80° C. | 90° C. | 40° C. |
| Ex. 1 | 25 | 0 | 0 | 75 | 30 | 0 | 31.3 | 43.3 | 4 |
| Ex. 2 | 0 | 50 | 0 | 50 | 0 | 15 | 31.3 | 45.3 | 1.3 |
| Ex. 3 | 0 | 0 | 25 | 75 | 0 | 20 | 30 | 42 | 3.3 |
| Ex. 4 | 0 | 0 | 50 | 50 | 0 | 15 | 40 | 49.3 | 1.3 |
| CE 1 | 0 | 0 | 0 | 100 | 0 | 25 | 21.3 | 32.7 | 3.3 |

[CE: Comparative Example]
Note:
mark (*) indicates the number of weight parts per 100 weight parts of the total amount of the components A and B.

In Example 1, the shrinkage factor was 31.3% at 80° C. and was 43.3% at 90° C., which was achieved by adding about 30 weight parts of the petroleum resin (C1), which has a low glass transition point (80° C.). In Example 2, the shrinkage factor was 31.3% at 80° C. and was 45.3% at 90° C., which was achieved by using equal amounts of the random polypropylene B1 and the propylene/1-butene random copolymer A2. In Example 3, the shrinkage factor was 30.0% at 80° C. and was 42.0% at 90° C., which was achieved even though the amount of the propylene/1-butene random copolymer A3 added to the random polypropylene B1 was reduced because the melting point of the copolymer A3 was lower than that of the propylene/1-butene random copolymer A2 used in Example 2. As shown in Example 4, the shrinkage factor can be further raised by increasing the amount of the propylene/1-butene random copolymer A3 compared to that in Example 3. Meanwhile, as shown in Comparative Example 1, when the propylene/1-butene random copolymer is not used, the target values (a shrinkage factor of at least 30% at 80° C. and a shrinkage factor of at least 40% at 90° C.) cannot be achieved. As to the natural shrinkage factor, the larger was the amount of the propylene/ 1-butene random copolymer A2 or A3 used in Example 2 or 4, the smaller was this factor.

The present invention makes it possible to perform low-temperature stretching by using a propylene/α-olefin random copolymer, and preferably a propylene/1-butene random copolymer having a low melting point and narrow compositional and molecular weight distributions and produced using a metallocene catalyst, and also provides a shrink film with excellent shrinkage characteristics at low temperatures.

What is claimed is:

1. A polyolefin resin composition comprising:
   (A) at least 10 wt % of a propylene/α-olefin random copolymer obtained by random copolymerization of propylene and a $C_2$ to $C_{20}$ α-olefin, and having a melting point as measured by differential scanning calorimeter (DSC) of 40 to 115° C. and an α-olefin content of 5 to 70 mol %;
   (B) 30 to 90 wt % of a random propylene resin having a melting point as measured by DSC of 120 to 150° C.; and
   (C) an alicyclic saturated hydrocarbon resin having a glass transition point of 20 to 100° C. and a number average molecular weight of 1200 or less, the component (C) being used in an amount of 5 to 100 weight parts per 100 weight parts of the total amount of the components (A) and (B).

2. A single-layer or multilayer film having a thickness of 50 to 500 μm and at least one layer formed from the resin composition according to claim 1.

3. A shrink film obtained by uniaxially or biaxially stretching the single-layer or multilayer film according to claim 2 to a draw ratio of at least 3 times.

4. A laminated film having a thickness of 50 to 500 μm, wherein at least one film selected from among polyolefin films, polystyrene films, polyester films, polyamide films, and laminates of a gas barrier resin and an adhesive polyolefin is laminated on one or both sides of a film formed from the resin composition according to claim 1.

5. A shrink film obtained by uniaxially or biaxially stretching the laminated film according to claim 4 to a draw ratio of at least 3 times.

6. The polyolefin resin composition of claim 1, wherein the α-olefin content of random copolymer (A) is 20 to 50 mol %.

7. The polyolefin resin composition of claim 1, wherein the random copolymer (A) has a melting point as measured by differential scanning calorimeter (DSC) of 65 to 110° C.

8. The polyolefin resin composition of claim 1, wherein the polyolefin resin composition comprises 20 to 70 wt % of the random copolymer (A).

9. The polyolefin resin composition of claim 1, wherein the polyolefin resin composition comprises 30 to 80 wt % of the random propylene resin (B).

10. The polyolefin resin composition of claim 1, wherein the polyolefin resin composition comprises at least one ingredient selected from the group consisting of a thermal stabilizer, antioxidant, UV absorbent, anti-blocking agent, slip agent, antistatic agent, weather stabilizer, anti-fogging agent, crystal nucleator, base absorbent, lubricant and flame retardant.

11. A shrink film obtained by uniaxially or biaxially stretching to a draw ratio of at least 3 times a single-layer or multilayer film having a thickness of 50 to 500 μm and at least one layer formed from a polyolefin resin composition comprising:
    (A) 10 to 100 wt % of a propylene/α-olefin random copolymer obtained by random copolymerization of propylene and a $C_2$ to $C_{20}$ α-olefin, and having a melting point as measured by differential scanning calorimeter (DSC) of 40 to 115° C. and an α-olefin content of 5 to 70 mol %;
    (B) 0 to 90 wt % of a random propylene resin having a melting point as measured by DSC of 120 to 150° C.; and
    (C) an alicyclic saturated hydrocarbon resin having a glass transition point of 20 to 100° C. and a number average molecular weight of 1200 or less, the component (C) being used in an amount of 5 to 100 weight parts per 100 weight parts of the total amount of the components (A) and (B).

12. A shrink film obtained by uniaxially or biaxially stretching to a draw ratio of at least 3 times a laminated film having a thickness of 50 to 500 μm and at least one film selected from among polyolefin films, polystyrene films, polyester films, polyamide films, and laminates of a gas barrier resin and an adhesive polyolefin is laminated on one or both sides of a film formed from a polyolefin resin composition comprising:
    (A) 10 to 100 wt % of a propylene/α-olefin random copolymer obtained by random copolymerization of propylene and a $C_2$ to $C_{20}$ α-olefin, and having a melting point as measured by differential scanning calorimeter (DSC) of 40 to 115° C. and an α-olefin content of 5 to 70 mol %;
    (B) 0 to 90 wt % of a random propylene resin having a melting point as measured by DSC of 120 to 150° C.; and
    (C) an alicyclic saturated hydrocarbon resin having a glass transition point of 20 to 100° C. and a number average molecular weight of 1200 or less, the component (C) being used in an amount of 5 to 100 weight parts per 100 weight parts of the total amount of the components (A) and (B).

* * * * *